United States Patent [19]

Strauss et al.

[11] 3,799,244

[45] Mar. 26, 1974

[54] SERVICE VEHICLE FOR MANHOLE OPERATION

[75] Inventors: Robert F. Strauss, Cary; Carl F. Lawrenz, Skokie, both of Ill.

[73] Assignee: Service Dynamics, Inc., Lake Bluff, Ill.

[22] Filed: Feb. 28, 1972

[21] Appl. No.: 229,642

[52] U.S. Cl.................................. 165/23, 165/42
[51] Int. Cl............................................ B60h 3/04
[58] Field of Search .................. 165/42, 43, 44, 23

[56] References Cited
UNITED STATES PATENTS
3,672,445 6/1972 Carson................................ 165/42

*Primary Examiner*—Charles Sukalo
*Attorney, Agent, or Firm*—Silverman & Cass

[57] ABSTRACT

A wheeled service vehicle for manhole operation adapted for towing and comprising a chassis frame mounting a variety of equipment, the vehicle and equipment all being self-contained and including a prime mover with several pieces of equipment driven thereby. A housing for the vehicle is independently removable from the chassis frame without disturbing the equipment thereby making access and servicing of the equipment a simple matter. The equipment includes a generator driven by the prime mover to provide electrical power, a water pump driven by the prime mover and means for conditioning air supplied by a blower powered by the generator. Novel heat exchange means enables the air furnished by the blower to be warmed by the exhaust and coolant of the prime mover. The prime mover is fueled by bottled fuel and means are provided to warm the bottles for cold weather operation.

7 Claims, 9 Drawing Figures

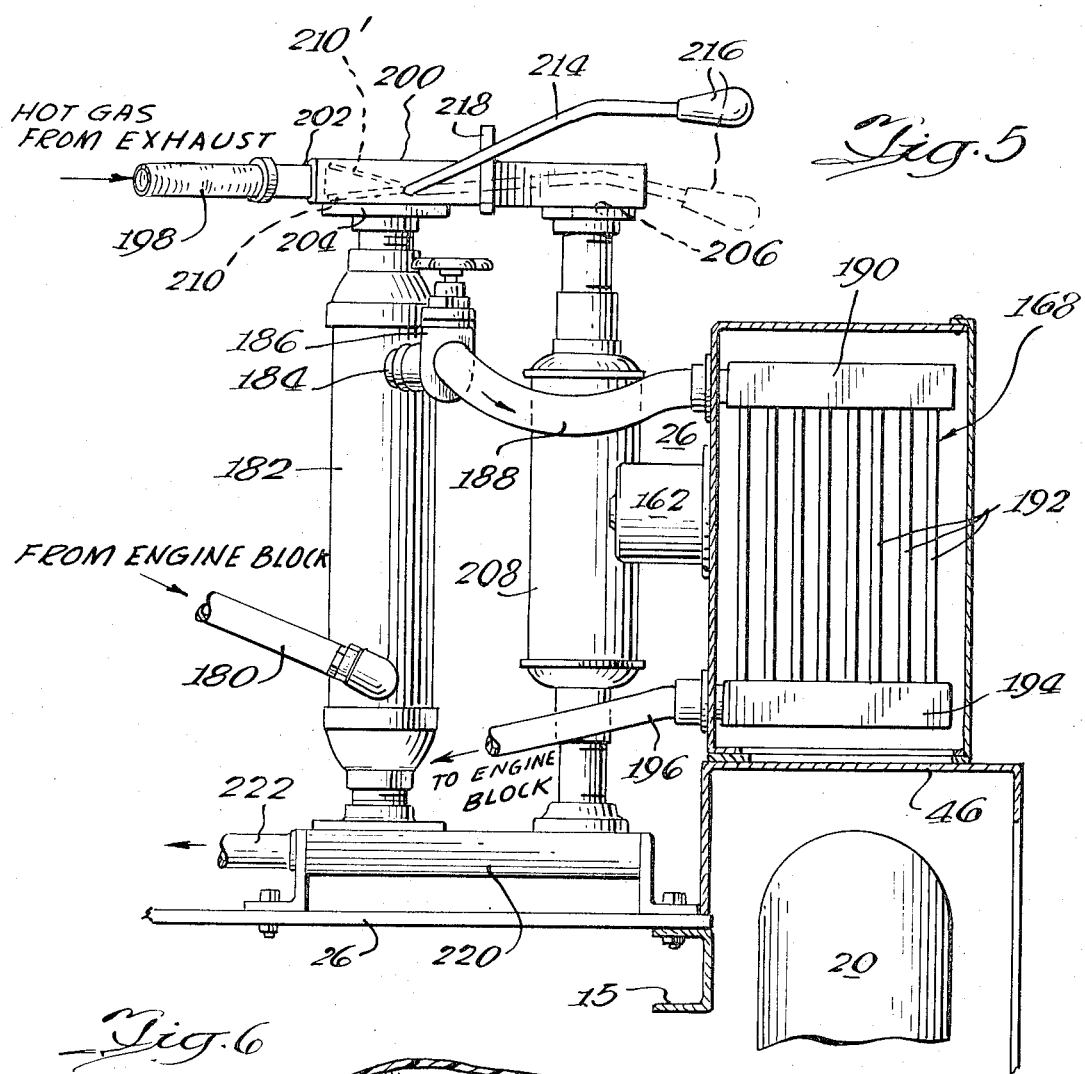
Fig.5
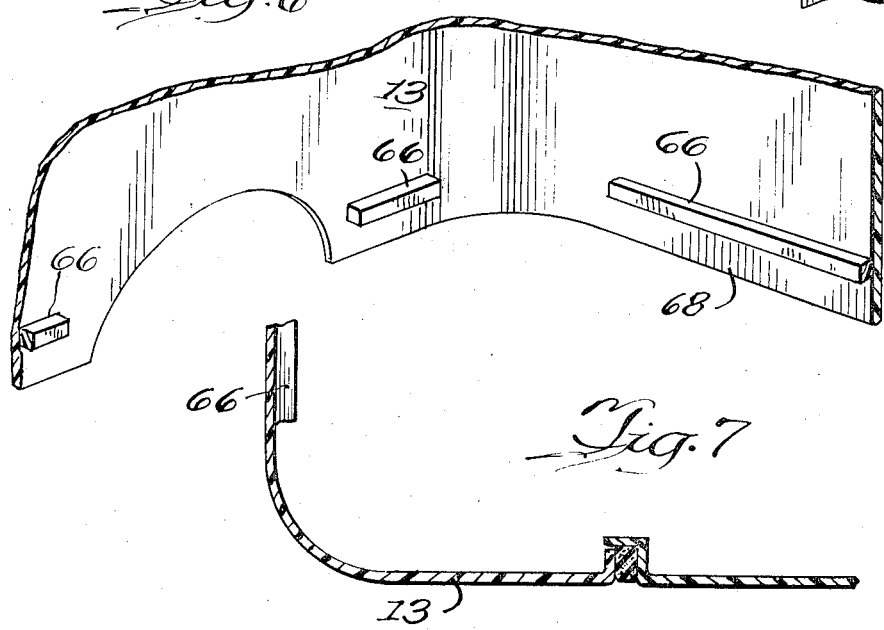
Fig.6
Fig.7

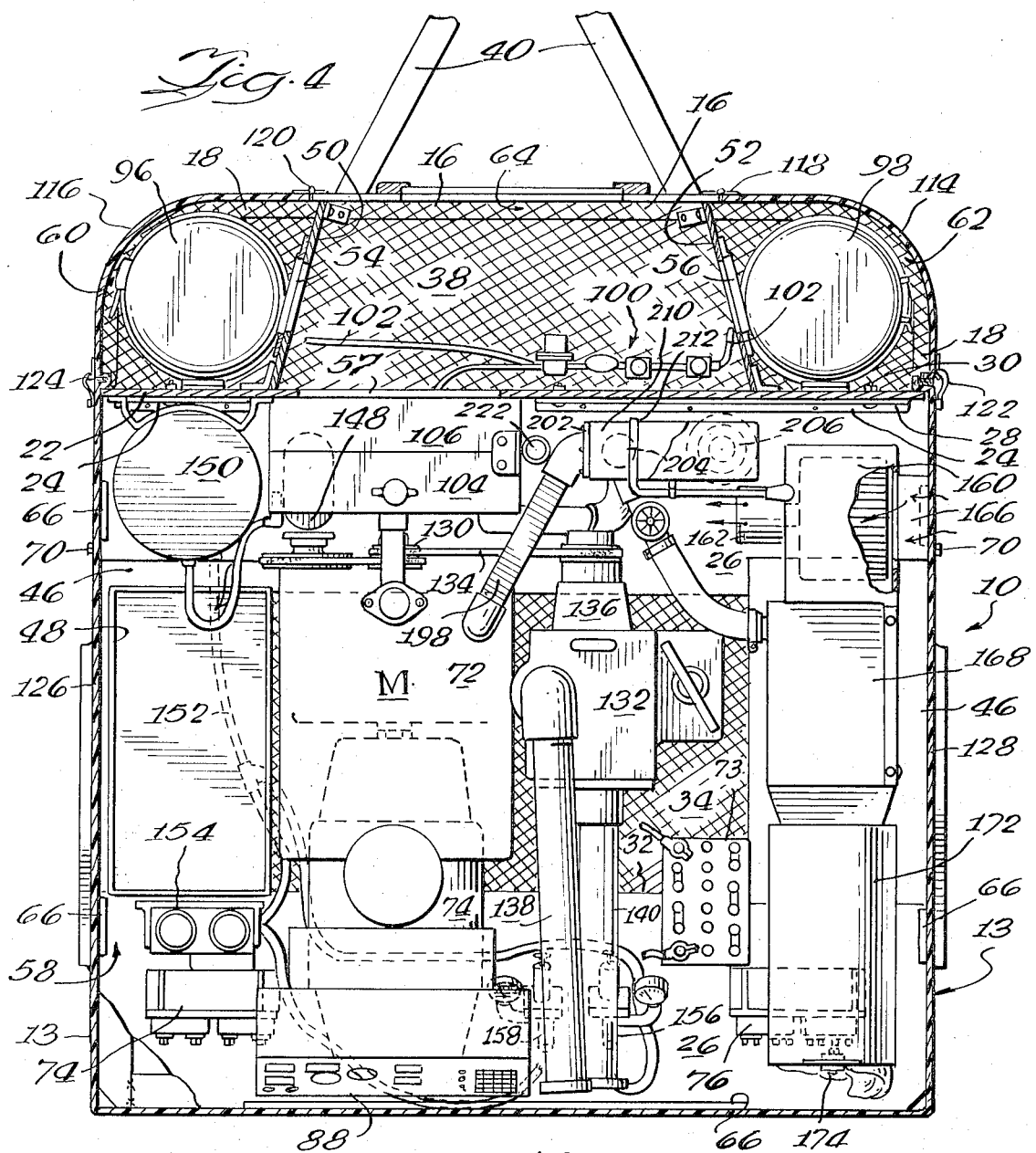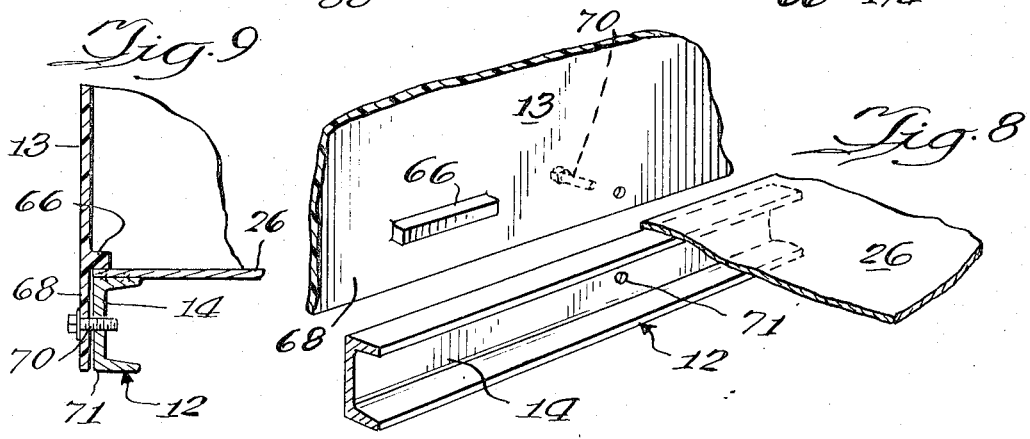

SERVICE VEHICLE FOR MANHOLE OPERATION

BACKGROUND OF THE INVENTION

The field of this invention comprises self-contained wheeled power units for use in the field, primarily for manhole operation. The problems of the men doing underground maintenance and construction work are varied and the equipment they need is manifold. Some of the problems encountered require all or many of the following functions and sources of power and the like:

Electricity

Many of the apparatuses which are used underground comprising motors, drills, soldering irons, welding equipment, testing instruments and the like are operated by electricity. This may be 120 volts or 240 volts and may be a.c. or d.c. The power may be as great as several horsepower. Ideally a service apparatus should furnish any of these and should do so with considerable control and safety.

Pumping

Manhole work is done underground where seepage and moisture readily accumulate and where leakages are sometimes the cause of the problems to be solved. The water must be pumped out and the working area kept dry by means of a powerful pump which is capable of handling trash and gravel normally encountered underground.

Compressed Air

Many jobs in manholes require the use of compressed air for multiple purposes. Air is needed to drive some equipment such as hammers and working tools. In explosive atmospheres air is the only power which can be used. Air is used for cleaning and testing, especially in the case of cable splices.

Ventilation

Workmen in manholes require ventilation, and the equipment which usually accompanies a job of this kind includes some means for supplying at least the ambient air to the manhole. In cold weather this air is not comfortable and would be best heated.

The above indicates that the equipment which must accompany a serviceman when he is going to work in a manhole is not simple. To supply all of the above requires considerable equipment and the logistics involved have heretofore been a substantial headache. The equipment was brought out to the site in multiple vehicles and where not accompanied by a truck which was tied down to the site, was scattered around the manhole presenting a rather undesirable appearance. To keep the equipment going and controlled required much maneuvering and adjusting. The expense of tying up a truck was great.

Since manhole work must be done without using any outside sources of power, a unit which can serve all of the purposes mentioned above and those related and not specifically detailed, must be self-contained. Prime movers for such units are normally internal combustion engines, with bottled fuel engines being preferred because handling their fuel is safer and the amount of emissions which are undesirable are less. Bottled fuel usually comprises propane, normally bottled under great pressure to substantial liquidity and injected into the engine as a gas. One problem with bottled fuel is that in cold weather the fuel does not readily gasify. The invention provides means for keeping the fuel bottles warm in cold weather.

All of the requirements of a unit for manhole work can be met with equipment which can be gathered together and mounted on a truck, but the cost would normally be excessive. Trucks are not made for specific operation as manhole vehicles and modification from standard structures would be prohibitively expensive.

The invention achieves all of the requirements of a comprehensive manhole vehicle at a great saving and in addition provides novel functions through the use of structures which enable the maximum of utility to be extracted from the equipment used. The actual vehicle per se has a novel construction. In addition, highly efficient and novel heat exchange apparatus is utilized.

The vehicle of the invention is totally portable, being equipped to be towed on its own wheels by a suitable truck.

SUMMARY OF THE INVENTION

A service vehicle for manhole operation is constructed in two parts, one comprising the chassis frame and structural supports and the other comprising a housing. The power and powered equipment is mounted on the chassis frame independently of the housing in substantially complete assembly. Thereafter, the entire housing which is an integral structure is simply lowered onto the chassis frame and secured in place by a pair of bolts. Likewise the removal of the housing is as simple — the bolts are removed and the housing raised ane set aside giving ready access to the total chassis frame and all equipment carried thereon.

The chassis frame includes partitions dividing the space upon the vehicle into a large central compartment and front compartments housing the fuel bottles. Air flow means are provided to enable controlled flow of heated air from the radiator of the prime mover to be directed against the bottles to warm them if desired, as for example in cold weather.

The equipment used includes a collapsible conduit and means for sucking air from the outside of the vehicle into the conduit and blowing the same into the manhole. According to the invention, novel means are provided for selectively warming that air by first extracting heat from the exhaust gases of the prime mover and raising the temperature of the coolant of the prime mover as it passes through a first heat exchanger and then transferring the heat from the coolant to the air in a second heat exchanger as the coolant passes through the second heat exchanger on its way back to the prime mover.

Other phases of the invention are embodied in additional structures to be described.

BRIEF DESCRIPTION OF THE DRAWINGS

FIG. 4 is a partially diagrammatic view taken as a section on a horizontal plane approximately half-way up the service vehicle and showing the layout of the principal components, portions being shown in plan and in section;

FIG. 5 is a detailed elevational view with portions in section showing the heat exchanger for conditioning leading provided by the service vehicle and the hot water heating apparatus therefor;

FIG. 6 is a fragmentary perspective view showing an inside corner of the housing of the vehicle;

FIG. 7 is a fragmentary sectional view taken through a corner of the housing of the vehicle;

FIG. 8 is a fragmentary perspective view showing details of the construction of the vehicle; and FIG. 9 is a sectional view also showing constructional details of the vehicle.

DESCRIPTION OF THE PREFERRED EMBODIMENT

Figure 1:
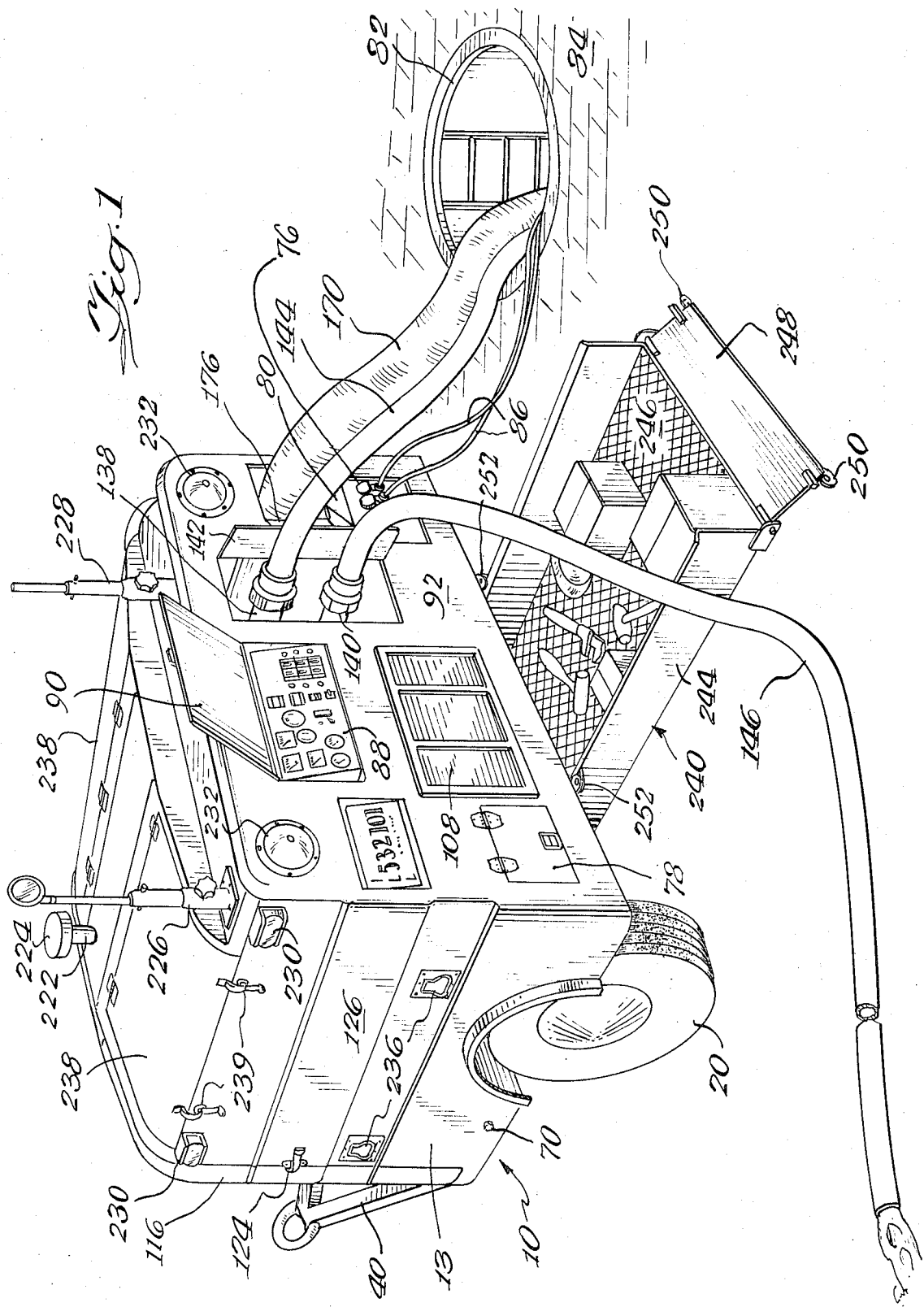
FIG. 1 is a rear perspective view of a service vehicle for manhole operation constructed in accordance with the invention and showing the same in use.
Figure 2:
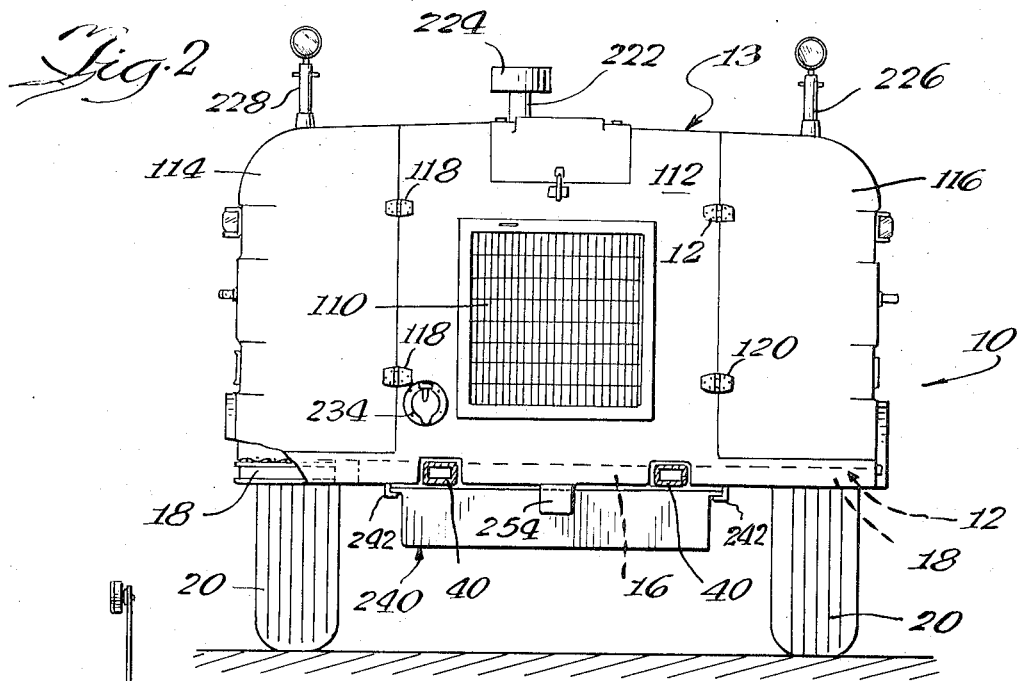
FIG. 2 is a front elevational view of the service vehicle in elevation but taken generally as a sectional view along the plane 2—2 of FIG. 3 and in the indicated direction.

In order to have an appreciation of the construction and operation of the service vehicle of the invention and its advantages, a short summary of the requirements of manhole operation will be of value. As previously pointed out, the most important single fact which controls the requirements for a service vehicle for manhole operation is that the operation thereof must be totally independent of any other source of power. The manhole may be in a remote location or required to be serviced in an emergency when other sources of power may be inoperative. The vehicle will normally be left in the field alone and without the presence of the truck which towed the same in order to free the truck for other work.

The vehicle thus becomes the source for all of the needs of the workmen at the manhole. It furnishes electricity of different voltages for driving tools and underground equipment; it must furnish heated air in the winter and cooling air in the summer; it must pump water and mud out of the manhole to keep the same substantially dry; it must provide compressed air for air tools and other purposes; and it must fuel and drive a prime mover to serve as a basic power source for driving all of the equipment which it carries. In the invention all of this is performed with efficiency and convenience by reason of the construction of the vehicle. Additionally, as stated above, much equipment duplication is eliminated, the vehicle is economically manufactured and easily serviced.

The vehicle of the invention is generally designated by the reference character 10 and comprises a chassis frame 12 that is welded together, being formed of commercially available steel members, sheet steel and expanded metal and a body 13 of fiberglass. The frame 12 is formed using channel members 14 (FIGS. 8 and 9) at the sides, connecting rectangular shapes at the ends as shown at 16, curved channel portions 18 at the rear corners and the like, all being welded together as a unit. Understructure (not shown) is connected to this frame 12 to suspend an axle, springs, shock absorbers, brake equipment and the like to support the tired wheels 20 which are shown supporting the vehicle 10.

The center of the chassis frame 12 has a transverse vertical partition or firewall 22 adjacent the front end of the vehicle 10 which is secured to the top of the chassis frame 12 by means of suitable cleats 24 mounted to the cover structure 26 of the frame as shown in FIG. 4. Any suitable fastening means such as 28 and 30 can mount the cleats 24 to the cover structure 26 and the firewall 22. The cover structure 26 comprises a sheet steel member overlying the chassis frame to provide support for equipment carried by the vehicle 10. It is welded in place at suitable points, as for example to the channel members 14 shown in FIGS. 8 and 9. The center of the cover structure 26 has a rectangular opening 32 into which is fastened a horizontal rectangular grille member 34 of expanded sheet metal or the like. This provides ventilation for the equipment in the vehicle 12. A second horizontal grille member 38 is welded across the entire front of the chassis frame 12 just ahead of the partition 22 to ventilate the forward portion of the vehicle. The partition 22 may be of steel or resin-impregnated fiberglass.

Reference to the front and rear of the vehicle 10 herein is only relative, since the vehicle may be constructed to be towed in any configuration. In the vehicle 10 illustrated and described, a towing yoke 40 made of robust rectangular steel members is welded to the front framing member 16 and any conventional towing hitch apparatus 42 may be mounted at the forward end thereof, preferably including a vertically adjustable standard 44 to enable the vehicle 10 to be supported independently. Conveniently, the standard or jack 44 may have a caster 45 swiveled to the bottom end thereof.

The sides of the chassis frame 12 are not rectilinearly continuous but are formed between their ends with a boxlike formation 46 on each side having an arcuate lower wheel well to clear the wheels 20. The formation 46 in each case is made out of steel members welded together and either bolted to the chassis frame 12 or welded integrally to the remainder of the chassis frame 12 so as not to sacrifice any of the strength of the frame 12. A continuation of side channels 14 offset therefrom is shown at 15 in FIG. 5 to provide additional bracing. The upper surfaces of the boxlike formations 46 may be seen in FIG. 4. On the left side in FIG. 4 there is a storage basket 48 secured to the formation while on the right side air conditioning equipment to be described is mounted.

The area forward of the firewall 22 is divided into three compartments by means of a pair of angled dividers 50 and 52 of steel or fiberglass each being secured to the firewall 22 and to the grille member 38 by suitable brackets or the like. Each of the dividers has an adjustable louvered ventilator 54 and 56 respectively mounted therein and the firewall 22 has a rectangular opening 57 cut therein for a purpose presently to be described (FIG. 4).

As thus far described, the vehicle has a chassis frame 12, an undercarriage with wheels and means for supporting and towing the same, a floor connected to the chassis frame 12 and formed of the cover structure 26, grille member 34, grille member 38, firewall 22 and dividers 50 and 52. The equipment and apparatus which is to be carried by the vehicle 10 and which will be described in detail will all be contained within the confines of the space whose plan is defined by the periphery of the chassis frame 12. Considering only the plan layout as best seen in FIG. 4, the structures described form a large central space 58 to the rear of the firewall 22, a front left corner space 60, a front right corner space 62 and a front center space 64. When the housing 13 is in place covering the chassis frame 12 and the equipment contained therein, these spaces will become compartments and hence will hereinafter be described as such.

Importance is attached to the fact that the structure as thus far described and without the housing 13 in place is ready for receiving all of the equipment completely thereon, with all connections and apparatus made, and assuming no major coupling or connecting need be done to the housing in order to render the vehicle fully operative. Accordingly, in the manufacture of the vehicle, with the completion of the chassis frame 12 and the compartmenting structures described, the equipment may be fully installed, and tested without the body in place. This makes fabrication extremely simple and convenient. In addition, as will be explained, since the housing is quickly removable, the vehicle and all of its equipment may be readily serviced, parts and apparatus replaced and repaired without having to climb or crawl into confined spaces or remove major components.

The housing 13 is a boxlike structure molded of resin-impregnated fiberglass in accordance with known techniques which covers the entire chassis frame and through various doors and access openings gives access to the resulting interior compartments. At suitable locations around the lower perimeter of the housing 13 there are provided cleats 66 which are integrally molded with the housing and spaced above the lower edge of the housing to provide an overhang 68 best shown in FIGS. 6 to 9. The housing 13 is so dimensioned as to slip over the entire chassis frame and clear all of the equipment contained thereon and come to rest with its cleats engaging the framing members 14, 16 and the like. The overhang 68 covers the structural members of the frame 12 to give a smooth uncluttered appearance to the exterior of the vehicle 10 and present no protruberances to catch on clothing and the like. A bolt 70 passing through the overhang 68 and through a perforation 71 in each side member 14 is all that is required to secure the housing 13 in place. Obviously, with only two bolts to attach the housing 13 to the chassis frame 12 mounting the housing 13 or removing the same is the simplest of operations.

Attention is now invited principally to FIG. 4 which shows the plan or layout of the equipment which is carried by the vehicle 10. First considering the rear compartment 58, there is a prime mover in the form of an internal combustion engine 72 mounted in the center of the compartment on the floor thereof directly coupled to an electric generator 74 that supplies the electricity required by the workmen. A self-starter is available (not shown) for starting the motor 72 by means of storage battery 73. The generator 74 makes connections with several junction boxes having suitable outlets, these being mounted on the interior of housing 13 clear of the rear wall 92 thereof as shown at 74 and 76. Hinged and latched doors 78 and 80 respectively engage openings formed in the housing wall 92 to give access to these outlets. In FIG. 1, a vehicle 10 is shown stationed near a manhole 82 in a street 84 and two extension cables 86 are shown connected to the right-hand outlet 76 for use by the workmen in the manhole 82 as for example in energizing tools, instruments and the like at the site below ground.

A relatively comprehensive instrument and control panel 88 is mounted inside of the housing 13 and connected to the floor cover structure 26 with access being had by way of a hinged and latched door 90 covering a suitable opening in the housing rear wall 92.

Figure 3:
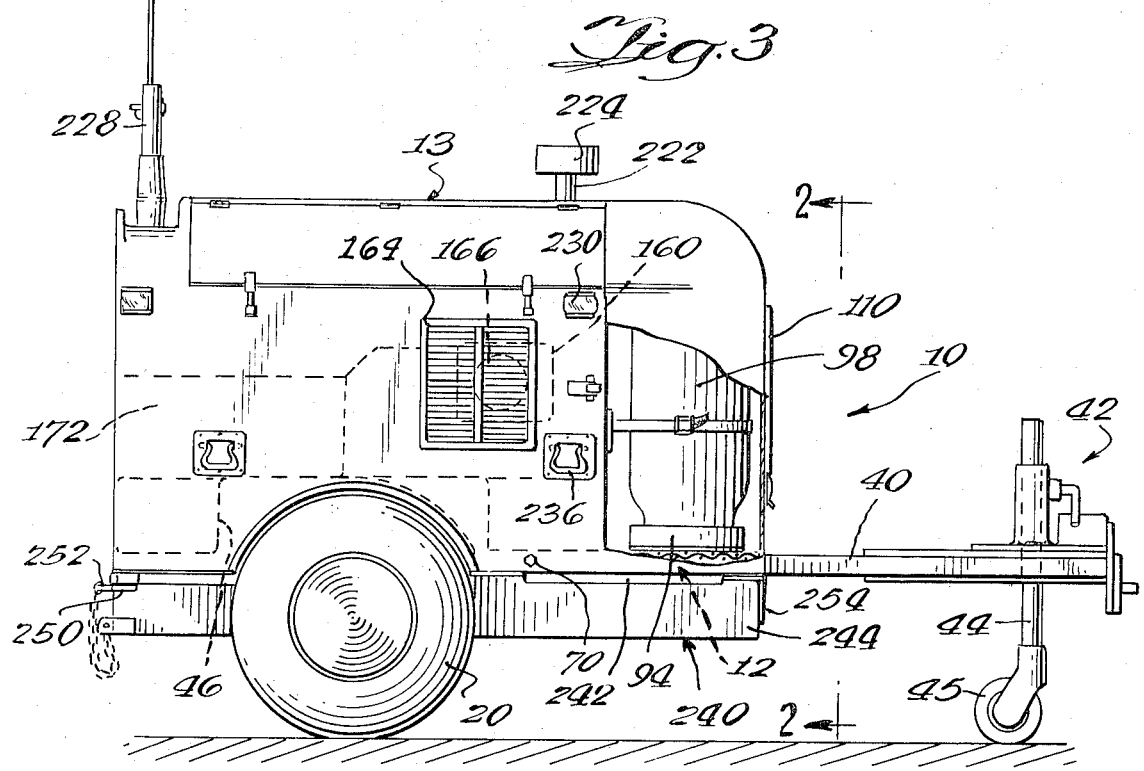
FIG. 3 is a side elevational view of the service vehicle with portions broken away to illustrate details thereof.

The internal combustion engine 72 is fueled by means of propane or the like bottled gas, the containers for which are stored in the compartments 60 and 62 being mounted in suitable support rings such as that shown in FIG. 3 at 94, the rings being welded to the grille member 38. Bottles, as they are called, are shown at 96 and 98 in the respective compartments 60 and 62, strapped in place and coupled to the engine 72 through suitable feed and throttle means 100 (not shown in detail) by means of conduits 102 passing through the dividers 50 and 52 and connected to the respective bottles 96 and 98 by conventional means.

The engine 74 is preferably of the liquid-cooled variety and a radiator 104 is shown for cooling the liquid, the radiator 104 being connected by way of a shroud 106 to the firewall 22 in alignment with the opening 57, a suitable engine-driven fan (not shown) being used to draw air through the radiator 104 and discharge the same into the central front compartment 64. Air will enter the main or rear compartment 58 through the grille member 34 and through the louvered ventilator 108 which is installed in the rear wall 92 of the housing 13. This ventilator 108 is adjustable manually. The heated air passing through the opening 57 into the compartment 64 can pass through the grille member 38, through the ventilator 54, through the ventilator 56 and through a large adjustable louvered ventilator 110 which is mounted in the front wall 112 of the housing 13. By adjusting the louvers of the ventilators 54, 56 and 110 the operator can control the amount of warm air which will be applied to the bottles 96 and 98. This is of great advantage since the gaseous fuel in the bottles 96 and 98 may have its pressure substantially reduced in cold weather to decrease the efficiency of operation of the internal combustion engine 72.

Access is had to the bottled fuel compartments 60 and 62 by means of the corner doors 114 and 116 which are hingedly secured at 118 and 120 to the rear wall 112 of the housing and are latched in place by the latches 122 and 124 respectively connecting with the side walls 126 and 128 respectively of the housing 13.

Returning once more to a description of the equipment within the vehicle 10, there is a sheave 130 directly mounted to the crankshaft of the engine 72 which drives a large capacity pump 132 through the belt 134 and an electric clutch 136 controlled either from the control panel 88 or remotely. The intake pipe is at 138 and the discharge pipe at 140. Each pipe stops short of the rear wall 92 so that the access door 142 may be closed when the pump 132 is not connected to exterior pipes. In FIG. 1 exterior pipes 144 and 146 are shown connected to the intake and discharge pipes respectively by suitable fittings, the pipe 144 extending into the manhole 82 to draw seepage from the manhole and the pipe 146 acting to discharge the effluent.

The sheave 130 may have another section which drives an air compressor 148 feeding a compressed air tank 150 from which a hose 152 extends to an air dryer 154 and to an air outlet 156. This latter outlet furnishes high pressure undried air. Air from the dryer 154 extends to a second air outlet 158 from which the operator can obtain dry low pressure air. Both outlets 156 and 158 are accessible through the same door 142 which gives access to the pump inlet and outlet pipes 138 and 140.

On the right-hand side of the compartment 58 there are disposed several articles of apparatus which comprise the air-conditioning equipment. The phrase "air-conditioning" is not intended to have the technical means normally ascribed to air conditioning as popularly used. Men working in a manhole require primarily ventilation in the form of substantially fresh air. If drawn from the ambient area above the manhole the temperature is normally acceptable, although in cold weather it is desirable that the air furnished within the manhole be warmed. The apparatus of the invention enables the furnishing of ambient or warmed air, with no attempt being made artificially to cool the air in warm weather or to adjust its humidity in any weather.

The box shown at 160 located just behind the firewall 22 on the right side of the vehicle 10 is a blower that is electrically driven by the motor 162 and acts to suck in air from the louvered ventilator 164 that is set in the side wall 128. The opening into the center of the blower is shown at 166 (FIGS. 3 and 4) and it may be directly opposite the ventilator 164 or connected thereto by a suitable plenum (not shown). The blower 160 is mounted in a suitable enclosure that also contains a heat exchanger 168 carried on the boxlike formation 46 so that air passes through the heat exchanger 168 driven by the blower 160 into the collapsible air conduit 170 that is normally held in contracted condition within a housing 172 connected to the heat exchanger 168. A suitable latch 174 holds the conduit 170 within its housing 172 spaced rearwardly of a hinged and latched door 176 mounted on the rear wall 92.

A novel structure for warming the air transmitted to the collapsible conduit 170 is provided according to the invention. Basically the water from the radiator 104 is passed through a first heat exchanger which heats it and then through the second heat exchanger by means of which the water heats the air circulated in the manhole. This process is accomplished by means of relatively simple but highly effective apparatus using the heat of the engine 72 in the most efficient manner.

Assuming that it is desired to heat the air which is passed down to the manhole by way of the collapsible conduit 170, it should be understood that this condition will occur when the ambient air is relatively cold. The water passing down through the radiator 104 will have been cooled since a good deal of its heat will have been desired to be extracted in order to warm the fuel bottles 96 and 98. This water will emerge from the bottom of the radiator 104 by way of a pipe 180 and will pass into the bottom of a tubular heat exchanger 182 and be conducted upwardly in intimate heat-exchange relationship with hot exhaust gases that are passing downwardly through the heat exchanger 182. The upper water outlet 184 of the heat exchanger 182 passes through the manual valve 186 to a hose 188 that connects to the upper end of the heat exchanger 168, into a plenum or header 190, down the narrow passageways 192 to the bottom plenum or header 194 and thence out of the heat exchanger 168 to the engine 72 by way of the hose 196.

The internal construction of the heat exchanger 182 is not illustrated but could take any well-known form such as the use of headers with small pipes as in the case of the second heat exchanger 168, a honeycomb or grid construction, etc. Obviously there is an independently physical flow system for the water and heated gases in opposite directions through the exchanger 182. Many such exchangers are commercially available.

The exhaust gases from the engine 72 are led by suitable exhaust pipe 198 to a switching box 200 which controls the path of flow of such exhaust gases. The switching box is a hollow well-sealed structure having an inlet 202 at its left-hand end and two outlet ports on its bottom surface, one at 204 aligned with the heat exchanger 182 and the other 206 spaced from the first and aligned with a conventional exhaust muffler 208. A flap valve or diverting vane 210 is mounted to a transverse shaft 212 that passes through the box 200 and connects with the control lever 214 that has a handle 216 by means of which the vane 210 may be moved to either of its two positions. In FIG. 5 the lower position is designated 210 and the upper position is designated 210'. The phantom position of the control lever 214 and handle 216 represent the situation when the diverting vane is in its upper position. A notched member 218 is secured to the box 200 to serve as a detent to hold the lever 214 in either of its two positions.

The exhaust gases from the heat exchanger 182 and from the muffler 208 pass into an outlet plenum or hollow base 220 secured to the floor 26 as shown in FIG. 5 and out of the end of the base 220 into an exhaust stack 222 that extends vertically out of the top of a suitable opening in the housing 13. The upper end may have a flapper to keep rain out or a baffle as shown at 224.

When it is desired not to heat the air from the blower 160, the handle 216 is grasped and moved upward as shown in FIG. 5. This causes the diverting vane 210 substantially to cover the opening 204 so that exhaust gases pass over the opening and to the right-hand end of the box 200 where they enter the opening 206, pass down the muffler 208 and out of the base 220 into the exhaust stack. What small amount of gases that get into the heat exchanger 182 due to leakage past the diverting vane 210 merely help exclude the exhaust from the muffler from backing up the heat exchanger 182 after entering the base 220. The water from the bottom of the radiator 104 will pass through the heat exchanger 182 without taking on any significant heat and pass without substantial effect through the heat exchanger 168. The muffler 208 will effectively muffle the noise of the engine 72.

When it is desired to heat the air from the blower 160, the handle 216 is grasped and moved upward, swinging the shaft 212 counterclockwise as viewed in FIG. 5. This raises the diverting vane 210 to the upper position 210' of FIG. 5. Now exhaust gases which are discharged into the box 200 from the pipe 198 will engage against the vane immediately after passing into the entrance port 202 and be diverted for the most part to pass downward through the discharge port 204 into the heat exchanger 182. The water from the radiator 104 which is circulating in the coils or small pipes or other passageways in the heat exchanger 182 will receive heat from the gases passing on the opposite surfaces of the heat exchange walls and will have its temperature raised. This water will then pass by way of the pipe 188 to the heat exchanger 168 and the reverse process will occur, that is, the air passing through the exchanger 168 will extract heat from the water circulating in the exchanger. The water will pass out and into the pipe 196 back to the engine while the warmed air will pass to the conduit 170 and into the manhole 82.

The construction described lends itself to easy manufacture and use. The housing 13 may be easily equipped with accessories for road use and highway travel. Masts as shown at 226 and 228 to carry warning lights and the like may be mounted on the top of the housing 13 with suitable telescoping fittings enabling them to be collapsed into the interior of the housing. Reflectors and side lights are shown at 230 and 232 suitable wiring being carried on the interior of the vehicle 10. An electrical plug-in for operating braking and warning lights is shown at 234 this being used while the vehicle is being trailered. Handles 236 enable the housing 13 to be raised when it is desired to work on the vehicle 10, these handles being useful for assembling the vehicle as well. Two access doors 238 are hingedly mounted on the upper side of the housing 13 held closed by suitable latches 239.

A storage tray 240 is slidably mounted under the floor of the vehicle 10 by means of cleats 242 engaging the flanged sides of the tray 240. Preferably the tray 240 is made with a steel framework 244 and an expanded metal bottom 246 so as not to interfere with circulation of air in the vehicle 10. The tray 240 slides out of the rear of the bottom of the vehicle 10 and has that end hinged as shown at 248 with the hinged ends having ears 250 cooperating with fixed other ears 252 connected to the chassis frame by means of which pins may be used to latch the end 248 closed at the same time that the tray 240 is slid all the way home. The stop member 254 at the front end of the chassis frame 12 limits the forward movement of the tray 240.

In the construction of the vehicle 10, the specifications may be varied depending upon the ultimate use to which the vehicle is to be put. The structure described in detail was especially intended for use by telephone repairmen but its universality make it useful in other fields as well, including use by power companies, gas companies, sewer and drainage workers and the like without substantial change.

One practical device had as its engine a 10 KV water-cooled propane fueled motor-generator set giving 120 volt a.c. and d.c. and 240 volt a.c. service with the 220 volt service operative at 60 cycles and capable of driving a single phase 3 horsepower appliance. Outlets for both voltages were provided. It was coupled as described by a belt connection to a rugged three-inch self-priming water pump capable of handling 300 gallons per minute and passing considerable trash without problem. The compressor was a 7 cubic feet per minute capacity and provided air at 125 p.s.i. for use in air tools and dry air at a lower pressure for testing cable splices. The motor was propane fueled and rated at 27 horsepower. All apparatus was controlled from the panel 88 which had meters for the electrical outlets, pressure and temperature gauges, switches and controls for the components, circuit breakers, etc.

It will be obvious that many variations can be made in the construction of the vehicle of the invention without departing from the spirit or scope of the invention as defined in the appended claims.

What it is desired to secure by letters patent of the United States is:

1. A vehicle for manhole operation or the like and comprising a chassis frame mounting wheels and having means for coupling the same to a truck or the like to be towed thereby, power and powered equipment mounted on said chassis frame and including at least a liquid cooled prime mover adapted to produce hot exhaust gases when operating, a generator coupled to the prime mover and adapted to provide electricity and there being electrical outlets for said electricity, a collapsible air conduit, a blower connected to blow air into said conduit, and a boxlike housing mounted on said chassis frame and covering all of said power and powered equipment, there being an access door in said housing to enable extending said conduit outside of the housing to lead air to a manhole or the like, an air connection between the blower and the outside of said housing so that the blower draws ambient air into the said blower and expels the same by way of said conduit, means driving the blower and powered by the electricity from said generator, and means for heating the air in said conduit, said last-mentioned means comprising a first heat exchanger and means for leading the exhaust gases and the cooling liquid from said prime mover therethrough in physically separated but heat exchanging relationship and a second heat exchanger having means for leadingg the liquid passed through the first heat exchanger and the air driven by said blower into said conduit in physically separated but heat exchanging relationship, the second heat exchanger being disposed between the blower and the conduit and there being means to lead the liquid from the second heat exchanger back to said prime mover and to expel the exhaust gases from said first heat exchanger.

2. The vehicle as claimed in claim 1 in which said prime mover includes a radiator for cooling the liquid of said prime mover, said radiator having an inlet and an outlet, there being a hose from the prime mover block to the inlet, there being a conduit connecting the outlet of said radiator to said first heat exchanger to lead the radiator liquid to said first heat exchanger.

3. A vehicle as claimed in claim 1 in which there is an exhaust muffler, an exhaust stack, a switching box and an outlet plenum mounted in said housing, a pipe connecting from the prime mover to the switching box, another pipe connecting from the outlet plenum to the exhaust stack, the muffler and first heat exchanger each being connected between said switching box and outlet plenum, and means for directing the exhaust gases entering the switching box to pass either through said muffler or said first heat exchanger.

4. The vehicle as claimed in claim 3 in which said last means comprise a diverting vane pivotally mounted in said switching box and manually controllable from the exterior thereof, the vane being movable between two positions, one in which it blocks exhaust gas flow to said first heat exchanger and opens a passage to said muffler and the other in which it blocks flow to said muffler and diverts exhaust gas flow to said first heat exchanger.

5. The vehicle as claimed in claim 3 in which said vane is mounted on a shaft passing through said switching box and there is a lever connected with said shaft on the exterior of said switching box.

6. The combination with an internal combustion liquid-cooled engine having a radiator provided with an inlet and outlet, a combination chamber exhaust outlet for discharging the burnt gases, a connection from the engine block to said radiator inlet and an inlet for liquid to said block, of means for selectively warming air, said latter means including a blower and a conduit, the blower being driven by the engine and drawing air from a source and directing same through the conduit, a first heat exchanger, a muffler, a switch box, an outlet plenum, the first heat exchanger and muffler being respectively connected between said switch box and plenum, a first pipe connected from the exhaust outlet to said switch box and the switch box being operable to direct burnt gases to flow to said plenum either through said muffler or first heat exchanger and be discharged from said plenum, a second pipe connected from said radiator outlet to said first heat exchanger whereby to direct liquid to flow through said first heat exchanger in heat exchange relationship with burnt gases flowing through said first heat exchanger, a second heat exchanger between the blower and conduit and a third pipe extending from said first heat exchanger to said second heat exchanger to cause heated liquid to flow through said second heat exchanger in heat exchange relationship with the air flowing through said second heat exchanger, and a fourth pipe connected from said second heat exchanger to the block inlet to lead liquid back to said engine.

7. The combination as claimed in claim 6 in which there is a diverting vane in said switch box controlled from the exterior of the box and movable between positions diverting exhaust gases to said first heat exchanger or blocking said gases from said first heat exchanger and permitting flow to said muffler.

* * * * *

PO-1050
(5/69)

UNITED STATES PATENT OFFICE
CERTIFICATE OF CORRECTION

Patent No.    3,799,244          Dated   March 26, 1974

Inventor(s)    ROBERT F. STRAUSS and CARL F. LAWRENZ

It is certified that error appears in the above-identified patent and that said Letters Patent are hereby corrected as shown below:

Column 2, line 31, change "ane" to --and--.
Column 3, line 6, change "leading" to --air--.
Column 10, line 26, change "leadingg" to --leading--; line 66, change "combination" to --combustion--.

Signed and sealed this 17th day of September 1974.

(SEL)
Attest:

McCOY M. GIBSON JR.            C. MARSHALL DANN
Attesting Officer             Commissioner of Patents